Patented Apr. 17, 1934

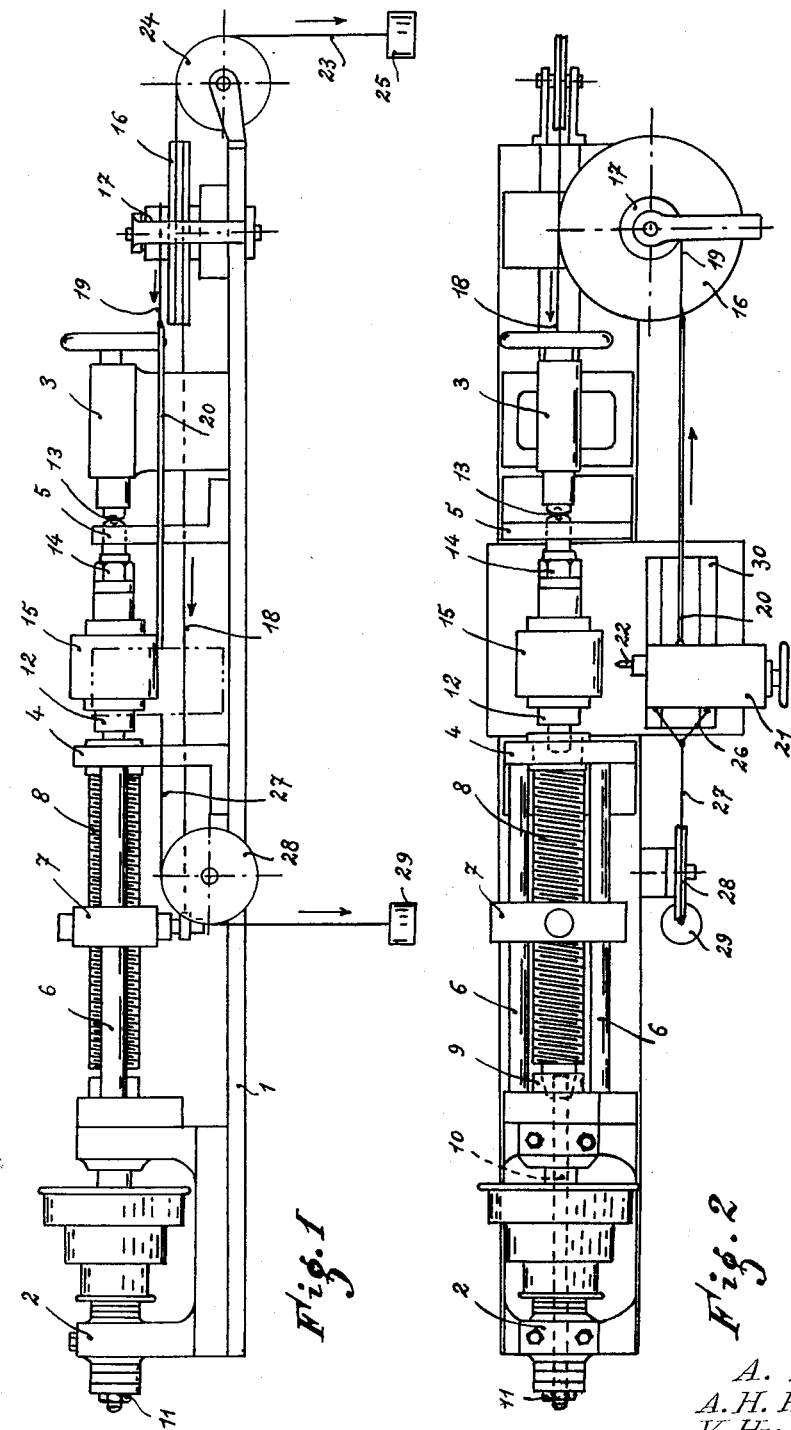

1,955,658

UNITED STATES PATENT OFFICE 1,955,658

ARRANGEMENT FOR ENGRAVING CYLINDERS TO OBTAIN FILMS WITH REFRINGENT ELEMENTS

Armand Rodde and Albert Henri Herault, Paris, Victor Hudeley, Clichy, and Jean Lagrave, Paris, France, Application May 13, 1933, Serial No. 670,966 In France May 13, 1932

2 Claims. (Cl. 82—2)

The present invention has for object an arrangement for engraving the cylinders for use in obtaining films with refringent elements.

Arrangements are already known for obtaining grooved cylinders by which it is possible to obtain films with refringent elements and interalia the method which consists in engraving the cylinder by means of a tool of such shape as to cut and remove the shaving or cutting.

Now this arrangement has the inconvenience of leaving in the bottom of the engraved groove a chattering which is prejudicial to the optical quality of the refringent elements obtained by moulding.

The arrangement according to the present invention overcomes this inconvenience by permitting of obtaining at the same time as the regular and symmetrical elements, perfectly polished grooves.

In this arrangement the tracing of the embossing cylinder is effected firstly with a special steel tool (or one of any other very hard material) embracing the ideal curve of the elements to be obtained. Then, by means of the same tool slightly dulled or of another tool likewise dulled prepared especially for this purpose and having the same form and curve as the previous one, a second passage through the grooves is made combining this action with a very fine polishing material such as jeweller's rouge. The pressure on the tool must be very light and if necessary the passages are repeated until a specular polish is obtained.

To obtain the precision necessary by such an arrangement, the invention provides means permitting of applying this arrangement and of obtaining the result sought.

This arrangement has the particular feature of comprising a master screw driven directly by the spindle of a lathe and which displaces during its rotary travel, a nut connected by means of flexible cables, to a tool turret mounted on slideways of high precision.

A further characteristic of the arrangement resides in that the nut has a wide bearing and is guided in its longitudinal movement by two slideways parallel to the screw.

Another feature consists in that the traction cable connected to the nut passes over a grooved platform and that this platform drives a grooved pulley on which winds a second cable secured at the end of a rod the other end of which is articulated to the tool turret carriage.

Finally another feature resides in that the traction of the first cable on the platform and the traction of the second cable on the carriage are partially compensated by other cables passing over pulleys and provided with counterweights.

The above arrangement will be better understood from the following description reference being had to the annexed drawing which shows:—

Fig. 1 an elevation of the engraving arrangement;

Fig. 2 a plan view of same.

The arrangement according to the invention comprises a lathe bed 1 which is robust and of great stability in order to avoid vibrations, on which is mounted the head stock 2 and the tail stock 3.

Between the head stock and the tail stock are secured on the bed 1 of the lathe, two bearings 4 and 5. The front headstock of the lathe is connected with the bearing 4 by two guide bars 6 on which a nut 7 can slide.

This nut screws onto a master screw 8 carried at one end by the bearing of support 4 and at the other end by the nose 9 of the head stock in which the conical extremity of the screw fits under the influence of the pull of a rod 10 screwed into the screw and which after passing through the hollow spindle of the lathe, receives a tightening or locknut 11.

At the other extremity of the screw 8 is provided a cavity in which the conical extremity of the spindle of a chuck 12 the other end of which passes through the support 5. This spindle is tightened against the head stock by the tail stock 3. A ball 13 is lodged between the extremities of the spindle and the tail stock.

On the mandrel 12 is secured, by means of a nut 14, the cylinder 15 which is to be engraved.

On the bed of the lathe 1 are mounted on the same spindle a circular platform 16 and a grooved pulley 17 integral with the latter. The platform 16 has two grooves on its periphery. One of the grooves receives a metal cable 18 fixed at one end to the nut 7 and at the other end to a suitable part of the plate or platform 16.

On the second groove of the latter is secured a cable 23 which passes over a pulley 24 secured on the bed of the lathe 1 and which is stretched by a counterweight 25.

In the groove of pulley 17 is secured a cable 19 connected by a rod 20 articulated to the carriage 21, carrying the cutting tool 22.

On the other side of the carriage 21 is secured by means of a rocking lever 26 a cable 27 which passes over a pulley 28 likewise carried on the bed of the lathe 1. Another counterweight 29 terminates the cable 27 and exerts thereon a pull.

The operation is extremely simple:

The nut 7 having been engaged on the master screw 8 fairly close to the support 4 to leave a sufficient travel, the mandrel 12, carrying the cylinder 15 to be engraved, is secured fast between the extremity of the spindle of the screw and the tail stock 3. The conical fitting of the spindle of the mandrel in said screw ensures a perfect solidity between these two parts.

Upon the rotation of the lathe and by reason of the screw 8, the nut 7 moves longitudinally on the slideways 6.

In moving, said nut exerts a pull on the cable 18 which causes the rotation of the plate 16. This latter drives the pulley 17 which is integral with it and which in its turn pulls on the cable 19 and consequently on the carriage 21 mounted on its dovetail slideways 30. If this carriage has been suitably disposed and the tool 22 brought into contact with the left side of the cylinder 15, the engraving will be effected on this latter over its entire periphery and the carriage will move progressively in an absolutely precise relation which will depend on the pitch of the master screw and the diameters of the plate 16 and the pulley 17.

Any vibration occasioned by the gear is eliminated and shocks are likewise obviated by the compensating counterweights 25 and 29 acting as antagonistic organs for the traction cables during the operation of the tool.

The grooves thus obtained on the cylinder are of perfect regularity as regards shape and distance apart.

The nut 7 by reason of its large bearing surface on the driving screw 8 automatically corrects the defects of the latter.

On the other hand, it is possible to obtain any desired width or spacings for the grooves by means of a judicious selection of the pitch of the screwthreads and the ratio of the diameters of the plate 16 and the pulley 17 such that at each rotation of the screw 8 there shall correspond a groove on the cylinder to be engraved.

The regularity of working of the apparatus permits therefore of applying all the better the method of engraving with several passages of the tools, provided for by the invention it being nevertheless understood that this engraving could be executed at a single passage of the tool if the nature thereof and the homogeneity of the metal of the cylinder to be engraved permitted, concurrently with a polishing material or not, to obtain grooves sufficiently clean and polished.

It is obvious that modifications of shape and detail may be embodied in the arrangement above described, given by way of simple example and in no way limiting, and that without exceeding the scope of the invention.

What we claim is:

1. In a device of the character described, a rotating screw threaded shaft, a member in engagement with the screw threaded shaft for longitudinal movement thereon with rotation of said shaft, a work support connected with said shaft to rotate therewith, a tool carriage disposed to cooperate with said work support, a pulley, a cable passing over said pulley and attached to said carriage, a platform fixed to said pulley, and a cable interconnecting said member with said platform to move said tool carriage.

2. In a device of the character described, a rotating screw threaded shaft, a member in engagement with the screw threaded shaft for longitudinal movement thereon with rotation of said shaft, a work support connected with said shaft to rotate therewith, a tool carriage disposed to cooperate with said work support, a pulley, a cable passing over said pulley and attached to said carriage, a platform fixed to said pulley, a cable interconnecting said member with said platform, to move said tool carriage, and further cables having counterweights attached thereto to compensate the pull exerted by said two first mentioned cables upon the tool carriage and platform respectively.

ARMAND RODDE.
ALBERT HENRI HERAULT.
VICTOR HUDELEY.
JEAN LAGRAVE.